(12) United States Patent
Aiken et al.

(10) Patent No.: US 10,691,653 B1
(45) Date of Patent: Jun. 23, 2020

(54) INTELLIGENT DATA BACKFILL AND MIGRATION OPERATIONS UTILIZING EVENT PROCESSING ARCHITECTURE

(71) Applicant: Amazon Technologies, Inc., Seattle, WA (US)

(72) Inventors: Mark Aran Aiken, Seattle, WA (US); Raghunathan Kothandaraman, Redmond, WA (US); Sam L. Nelson, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 420 days.

(21) Appl. No.: 15/695,721

(22) Filed: Sep. 5, 2017

(51) Int. Cl.
*G06F 16/30* (2019.01)
*G06F 16/21* (2019.01)
*G06F 21/62* (2013.01)
*G06F 9/54* (2006.01)
*G06F 16/25* (2019.01)

(52) U.S. Cl.
CPC ............ *G06F 16/214* (2019.01); *G06F 9/542* (2013.01); *G06F 16/258* (2019.01); *G06F 21/6218* (2013.01)

(58) Field of Classification Search
CPC ..... G06F 16/214; G06F 16/258; G06F 16/958

USPC ........ 707/607, 609, 687, 705, 790, 813, 821
See application file for complete search history.

(56) References Cited

U.S. PATENT DOCUMENTS

| | | | |
|---|---|---|---|
| 10,133,759 B1 * | 11/2018 | Abuomar | G06F 16/285 |
| 10,185,507 B1 * | 1/2019 | Olson | G06F 3/0689 |
| 10,268,593 B1 * | 4/2019 | Olson | G06F 12/1009 |
| 2013/0311433 A1 * | 11/2013 | Gero | H04L 69/04 707/692 |
| 2014/0365460 A1 * | 12/2014 | Portnoy | G06F 16/958 707/710 |
| 2017/0310557 A1 * | 10/2017 | Prakash | H04L 67/32 |

* cited by examiner

*Primary Examiner* — Sana A Al-Hashemi
(74) *Attorney, Agent, or Firm* — Thomas | Horstemeyer, LLP (57) ABSTRACT

Disclosed are various embodiments for intelligent backfill and data migration operations performed using an event processing architecture. A backfill system may identify backfill operations to migrate legacy data from a first system to a second system and generate events to provide to an event processor, where each of the events causes a backfill operation to be performed. Access to the events may be selectively controlled using an event processing queue such that the events are processed and the backfill operations are performed when a computing resource has available computing resources, regardless of a time of day.

20 Claims, 7 Drawing Sheets

```
109b
{
    "event": {
        "event_identifier": "A9578ZEF2",          203b
        "status": "initiated",                     206b
        "user_account_identifer": "76942813Z2",    209b
        "timestamp": "2016-12-12 12:00PM EST",
        "automaton_identifier": "42A",            212b
        "misc_payload": {
            ...                                    215b
        }
    }
}
```

INTELLIGENT DATA BACKFILL AND MIGRATION OPERATIONS UTILIZING EVENT PROCESSING ARCHITECTURE

BACKGROUND

Backfill operations generally include operations that migrate data seamlessly between systems. For instance, when migrating from a legacy data processing system to a new state-of-the-art data processing system, the new system will be developed by engineers and existing data used by the legacy system will be backfilled or otherwise migrated to the new system such that the new system will become compatible and operational with existing data. End users may not be aware of the migration to the new system, as their user account data is retained and used by the new system.

Large-scale data processing systems such as web services and the like can produce vast amounts of log data including data generated by various end users, such as visitors of a network site and users of a mobile application. From time to time, it may be desirable to review such data to identify events of interest. For example, a marketing department may desire to identify behavioral patterns of individual users. However, the quantity of log data generated by such systems may present significant difficulties in terms of data storage and review. Querying data stores having millions to billions of entries, for example, may consume bandwidth, monopolize computing resources, and provide slow search results. Moreover, determining actions that influence how a consumer interacts with an application or service may be subjective and speculative.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to intelligent backfill operations performed using event processing and pattern matching architecture. An event processing architecture, such as the event processing architecture described in U.S. patent application Ser. No. 15/262,752 entitled "EVENT PROCESSING ARCHITECTURE FOR REAL-TIME USER ENGAGEMENT," filed Sep. 12, 2016, which is incorporated by reference in its entirety herein, may be used to process a large amount of events, such as events generated by users through interactions with various applications or services.

For instance, an event monitoring system may be provided to monitor user-generated events in real-time to identify patterns as they occur. Events may be generated by various applications or services, for example, when a user interacts with a user interface component, views a product page for a particular item in a shopping application, purchases one or more items, starts playback of a movie or song in a media player, finishes a novel in an e-booker reader application, or takes another action. Thus, events may describe an interaction performed by a user in association with a particular application, such as a web browser, a media player, an e-book reader application, a shopping application, or other similar type of application.

However, to begin tracking events for a given user account, any legacy systems must be discontinued and the new event monitoring system must be made active. In some instances, legacy data pertaining to the user account must be migrated to the new system. Accordingly, various embodiments of the present disclosure describe a backfill system that may be employed to migrate data from a legacy system to a new system. Backfill operations are those that may be performed to migrate data in a format for interpretation by a first system to a format for interpretation by a second system. In general, a backfill operation may include any operation that corrects the existing state of a system. Backfill operations are commonly employed to fill gaps in data are, thus, commonly employed in migration of data from one system to another. As an example, before a new shopping platform becomes live and starts accepting transactions from new customers, backfill operations may be performed to migrate data from a legacy shopping platform to the new shopping platform so that existing customers can also take advantage of new features and benefits of the new shopping platform.

Typically, legacy data is transferred over to a new system before the new system has been made active, usually at night or during another time of low network traffic. The backfill system described herein, however, may migrate data by performing migration operations with a new system is active. Additionally, the backfill system will control a rate of backfill or, in other words, a rate at which backfill operations are performed, such that a performance of the new system is not affected or impaired.

For instance, it can be important to ensure that the backfill operations do not affect the ability of a new system to handle real-time traffic. Traditionally, to allow for this, backfill operations are scheduled and periodically ran during lean periods, or periods of time when a system is not heavily used. Thus, backfill operations are traditionally ran during the evening or overnight as network traffic is generally less than during the day. While sometimes advantageous, static time scheduling does not consider periods of lean time during the day. However, by utilizing lean periods, regardless of the time of day, backfill operations may be performed in a more timely fashion. It is even more critical when accuracy of computed data is dependent on the backfill of legacy data. For example, an accuracy of a stock quote may be dependent on data being available for the past twenty periods of time. If data is only available for the last three periods of time, backfilling data for the prior seventeen periods of time in a timely fashion may be necessary to provide an accurate stock quote. Moreover, backfill operations are notoriously prone to error.

According to various embodiments of the present disclosure, backfill operations required to translate legacy data into data interpretable by a new system may be implemented as an automaton, or a self-operating control application configured to automatically follow a predetermined sequence of operations or respond to predetermined instructions.

In some embodiments, the backfill operations may be translated into a stream of events that may be periodically processed by an event processing system or other new system. In various embodiments, events may be buffered in a queue, referred to herein as an event processing queue. In various embodiments, the rate of event consumption or, in other words, the rate events are processed to perform backfill operations may be controlled by an intelligent feedback loop. Additionally, a rate of event generation may be controlled as well. In some embodiments, a conservative setting for a rate of event consumption or event generation may be provided initially and the rate of event consumption or event generation may be slowly dialed up or dialed down as required based on available computing resources of the event processing system.

As a non-limiting example, assume that a hospital has built a new healthcare system that allows its patients to check health records, access prescriptions, or communicate with medical professionals. As a legacy system of the hospital may have approximately a million patient data records, a million or more operations may be required to backfill the data from the legacy system onto the new healthcare system. A traditional approach may include taking all the data from the legacy databases, constructing a large flat file, and uploading or otherwise importing the flat file into a database used by the new healthcare system. This requires construction of a very large database which is computationally inefficient and may be tedious and time consuming. Additionally, it is difficult and computationally intensive to perform any data processing or translations to transform the legacy data into a format of the new healthcare system.

Accordingly, in various embodiments described herein, a migration of data may be performed on a per user account basis (e.g., per customer, patient, or other user). The backfill operations required to perform the migration of data may include aggregating data for a particular user account from a multitude of services or databases, supplementing the data with other data, modifying the format of the data, as well as other operations as may be appreciated. The backfill operations may be modeled as a workflow that may be performed by an automaton, which may include a virtual process, as will be described. The automaton or the virtual process may be configured to uniquely identify a single atomic unit of a backfill to be performed. Accordingly, the backfill system may be configured to handle an arbitrary number of backfill operations.

As events may be received in a stream totaling thousands to millions, certain architectural arrangements may be employed such that events are processed and backfill operations are performed in a computationally efficient manner. The architectural arrangements described herein improve the performance of various computing systems during backfill and migration operations, for example, by selectively controlling a rate at which events are processed by an event processing system such that a server or other computing device is not overloaded while using available and unused computing resources that may arise during unconventional processing times.

In the following discussion, a general description of a backfill system and its components are provided, followed by a discussion of the operation of the same.

Figure 1:
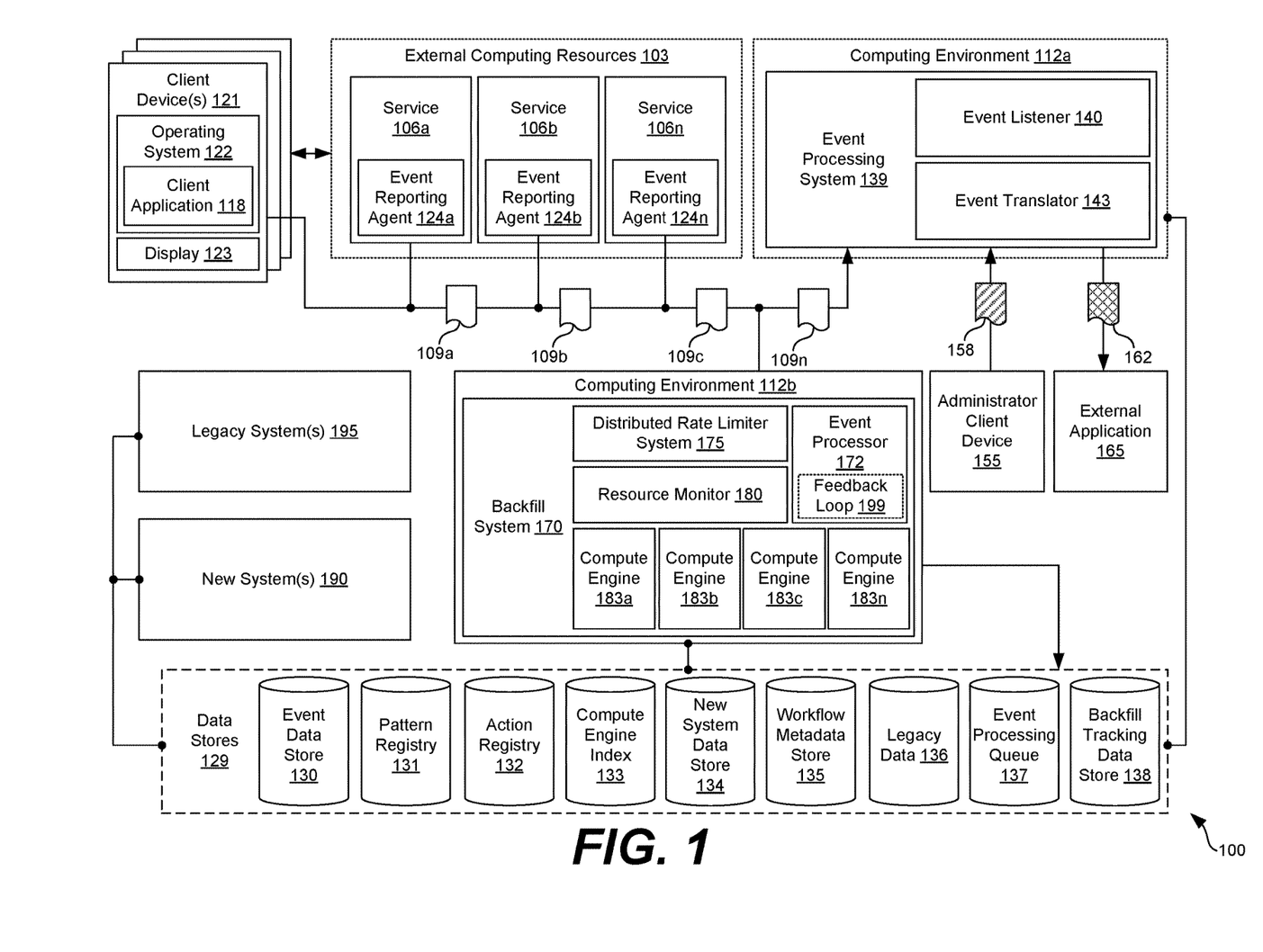
FIG. 1 is a drawing of an event handling system implemented as a networked environment according to various embodiments of the present disclosure.

With reference to FIG. 1, a networked environment 100 is shown according to various embodiments of the present disclosure. The networked environment 100 includes external computing resources 103 that include a number of services 106a . . . 106n (collectively "services 106"), as will be described. Generally, the services 106 report events 109a . . . 109n (collectively "events 109") to a computing environment 112a . . . 112b for analysis. Events 109 may include data structures or other data formatted to describe an interaction with a client application 118 executable on a client device 121 or one of the services 106, as will also be described.

In one embodiment, each of the services 106 are executed on one or more servers or other hardware with like capability to serve up network data to the client device 121 as well as observe interactions with the client application 118. For example, the services 106 may serve up network pages to the client devices 121 or data used to generate user interfaces in a dedicated application. As the services 106 serve up the network data to the client devices 121, the services 106 may be configured to detect when a user manipulates a hyperlink, a button in a user interface, or performs another type of action, such as purchasing an item in an electronic commerce system, playing a movie, and so forth, based on requests. As interactions are observed, the services 106 may be configured to communicate an event 109 to the computing environment 112 describing an interaction with a client application 118 or a service 106 as soon as it is identified, or shortly thereafter.

The services 106 may communicate events 109 to the computing environment 112 over a network that may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The tasks performed by each respective service 106, such as serving up content to client applications 118, may be independent of the tasks performed by other services 106. In this respect, each service 106 may be disconnected or independent of the other services 106. Stated another way, in an example, no one service 106 knows about the operations or tasks performed by any of the other services 106. Thus, the services 106 may operate independently of each other.

The services 106 may include event reporting agents 124a . . . 124n (collectively "event reporting agents 124"). Each of the event reporting agents 124 may include code, program instructions, or other logic that operates in conjunction with a particular client application 118 or function of a client device 121 to measure user interactions. In other words, the event reporting agents 124 generate events 109 describing interactions that are transmitted to a computing environment 112 over a network. In some embodiments, the event reporting agents 124 may be executed on the client device 121, for example, as a component of the client application 118 or as a standalone application.

For a given service 106, events 109 generated by the service 106 may be in a format different from other events 109 generated by other services 106. For instance, a client application 118 may include a media player application that plays media files, such as music or movies. If a user selects "play" in the media player application, an event 109 describing that interaction may be generated by the service 106 and sent to the computing environment 112 for analysis. Similarly, if the user purchases an item in a shopping application, another event 109 describing completion of a purchase may be generated by a service 106 and sent to the computing environment 112. As may be appreciated, the event 109 describing the interaction with the media player application may be in a format different from that of the event 109 describing the interaction with the shopping application. In other embodiments, the services 106 communicate events 109 to the computing environment 112 in a common format.

The computing environment 112 may comprise, for example, a server computer or any other system providing computing capability. Alternatively, the computing environment 112 may employ a plurality of computing devices that may be arranged, for example, in one or more server banks or computer banks or other arrangements. Such computing devices may be located in a single installation or may be distributed among many different geographical locations. For example, the computing environment 112 may include a plurality of computing devices that together may comprise a hosted computing resource, a grid computing resource and/or any other distributed computing arrangement. In some cases, the computing environment 112 may correspond to an elastic computing resource where the allotted capacity of processing, network, storage, or other computing-related resources may vary over time.

Various applications or other functionality may be executed in the computing environment 112 according to various embodiments. In addition, various data is stored in data stores 129 that are accessible to the computing environment 112. The data stores 129 may include, for example, an event data store 130, a pattern registry 131, an action registry 132, a compute engine index 133, new system data store 134, workflow metadata store 135, legacy data 136, an event processing queue 137, a backfill tracking data store 138, as well as other data stores as may be appreciated. The data stores are associated with the operation of the various applications or functional entities described below.

The components executed on the computing environment 112, for example, include an event processing system 139 and other applications, services, processes, systems, engines, or functionality not discussed in detail herein. The event processing system 139 is executed to process events 109 received from the services 106, identify certain patterns of events, and perform predetermined actions when patterns of events are identified. The processing of events 109 may include classifying events 109 and communicating events 109 to appropriate computer services such that the events 109 may be processed in a computationally efficient manner. To this end, the event processing system 139 may include an event listener 140, an event translator 143, an event processor 172, as well as other services not discussed in detail herein.

In some embodiments, the event processing system 139 may generate virtual processes that are spawned to process events 109. For instance, if a user creates or logs in to a user account on a particular client device 121, all events 109 generated by a corresponding service 106 may be routed to a virtual process for that user account. Virtual processes may include, for example, instances of a virtual machine, threads executing in parallel, or similar processes.

The event listener 140 is executed to monitor events 109 received from the services 106 or client applications 118, classify events 109, and send events 109 to interested compute engines 183 (e.g., compute engines 183 that utilize those events 109 in matching a pattern). In some embodiments, the event listener 140 receives a stream of events 109 in a queue, buffer, or like mechanism. The event translator 143 is executed to translate events 109 from a current format to another that a compute engine 183 is able to interpret.

The client device 121 is representative of a plurality of client devices that may be coupled to a network. The client device 121 may comprise, for example, a processor-based system such as a computer system and may include an operating system 122. Such a computer system may be embodied in the form of a desktop computer, a laptop computer, personal digital assistant, cellular telephone, smartphone, smartwatch, set-top box, music player, web pad, tablet computer system, game console, electronic book reader, or other devices with like capability. The client device 121 may include a display 123. The display 123 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client devices 121 may be configured to execute various applications such as a client application 118 or other applications. The client application 118 may be executed in the client device 121, for example, to access network content served up by the services 106 or other servers, thereby rendering a user interface on the display 123. To this end, the client application 118 may comprise, for example, a web browser, a dedicated application, etc., and the user interface may comprise a network page, an application screen, etc. In some embodiments, the dedicated application includes, for example, email applications, social networking applications, word processors, spreadsheets, and/or other applications. The client device 121 may be configured to execute applications beyond the client application 118.

The computing environment 112a is implemented to receive events 109 from the services 106 and to record such events 109 in the event data store 130. In doing so, the computing environment 112 may be configured to generate a timestamp of the time that the events 109 were received and may insert the timestamp as an attribute of the events 109 before they are stored in the event data store 130. In addition, the event processing system 139 may perform other operations on the events 109 before they are stored in the event data stores 130. In some embodiments, the computing environment 112 may defer to other authoritative sources to record events 109 in the event data store 130. For example, the services 106 that generate the events 109 may record events 109 in their own data stores. In such instances, the computing environment 112 may include custom data adapters that can fetch events 109 from these data sources, when required. This may reduce event storage operations at the computing environment 112a to increase computational efficiency, as may be appreciated.

The event processing system 139 may cooperate with administrator client devices 155 in order to retrieve various ones of the events 109 stored in the event data store 130 or data associated therewith. Additionally, the event processing system 139 may facilitate the creation of a pattern of events. A pattern of events (hereinafter "pattern 158") may include an event 109 or collection of events 109 that an administrator may specify to measure user interaction with an application or service. For instance, if an administrator desires to receive a notification when a particular user or group of users has watched five movies in a media player application, the administrator may specify a pattern 158 that detects five instances of a user having watched a movie in the media player application. The pattern 158 may also specify an order in which the events 109 should be received for events 109 in the pattern 158 to be matched.

The event processing system 139 may further facilitate the creation of an action 162 to be performed when all events 109 in a pattern 158 have been completed. Referring back to the example above, an administrator may specify a pattern 158 to identify users who have watched five movies in the month of August. If the administrator desires to reward users who perform events 109 that match a pattern 158, the administrator may specify an action 162 to be performed automatically when the pattern 158 is complete. For example, users who watch five movies in the month of August may automatically be provided with a coupon to rent a new movie. The event processing system 139 may communicate with external applications 165 to cause performance of actions 162 specified by an administrator via an administrator client device 155. External applications 165 may include other servers or like computer systems.

The networked environment 100 may further include another computing environment 112b that may be the same as or different from the computing environment 112a. The computing environment 112b may include a backfill system 170, an event processor 172, a distributed rate limiter system 175, a resource monitor 180, as well as other applications, services, modules, not described herein. The backfill system 170 is executed to identify backfill operations that require to be performed, for example, to migrate data from a first system to a second system or otherwise provision data to a system.

The event processor 172 interacts with the distributed rate limiter system 175 to selectively control a rate at which events 109 are received or otherwise processed by the backfill system 170. To this end, the rate as which events 109 are consumed by the backfill system 170 may be controlled based at least in part on an availability, or lack thereof, of computing resources of the backfill system 170, the computing environments 112a . . . 112b, the event processing queue 137, or other service. The resource monitor 180 is executed to identify the availability, or lack thereof, of computing resources. In some embodiments, the resource monitor 180 may generate one or more metrics that are representative of a load on available computing resources. The metrics may include, for example, central processing unit (CPU) utilization, graphics processing unit (GPU) utilization, available storage space, available memory, network bandwidth, and similar resources.

In some embodiments, the backfill system 170 may generate virtual processes referred to herein as compute engines 183a . . . 183n (collectively "compute engines 183") that are spawned to perform backfill operations. As compute engines 183 may include virtual processes, the compute engines 183 may include, for example, instances of a virtual machine, threads executing in parallel, or similar processes.

The event processor 146 is executed to assist with backfill operations, for example, by accessing events from the event processing queue 137 that include events 109 generated to perform backfill operations. In some embodiments, the event processor 146 obtains permission from an external service that controls a rate at which events 109 are accessed to perform backfill operations, such that the computing environment 112a does not become overloaded performing backfill operations. If permission is obtained, the event processor 146 spawns a virtual process, such as a compute engine 183 to implement a particular workflow that transforms legacy data 136 to new system data for storage in the new system data store 134. The compute engine 183 may be described as an automaton, which may include a virtual process designed to automatically follow a predetermined sequence of operations defined by the workflow metadata store 135.

In various embodiments, the backfill system 170 may store events 109 for backfill operations in the event processing queue 137. The event processor 172 may query the distributed rate limiter system 175 to determine whether the event processing system 139 is permitted to process one or more events 109 stored in the event processing queue 137. If the computing environment 112a or other computer system has available resources, the distributed rate limiter system 175 may permit the event processor 172 to retrieve events 109 from the event processing queue 137.

Next, a general discussion of the operation of the various components of the networked environment 100 is provided. As users of the client devices 121 interact with various types of client applications 118 on their respective client devices 121, the services 106 that provide data for those client applications 118 may identify what type of user interactions occur based on the type of data requested. The services 106 may communicate data pertaining to those interactions as events 109. Some examples of user interaction may include a user purchasing a product, streaming a movie, sharing photographs, viewing a product page, streamlining music, or other similar quantifiable action. Each of the events 109 in the stream of events 109 may identify a particular user account associated with a client device 121 on which the events 109 were performed. The computing environment 112a may receive the events 109 as a stream from various services 106 in response to interactions performed on client devices 121.

To begin utilizing the event processing system 139, or other new system 190, a data migration may be required to transform legacy data 136 generated by or for a legacy system 195 to data able to be interpreted by the new system 190. Accordingly, the backfill system 170 may be implemented to perform backfill operations and data migrations. A new system 190, such as the event processing system 139, may receive a substantial amount of events 109 during times of day when users are busy interacting with their client devices 121, such as between 9:00 AM and 5:00 PM local time. Hence, backfill operations are traditionally performed at nighttime hours to account for the lack of available computing resources during the day. Certain downtimes during the day, however, provide computational resources that go unused and certain backfill operations may be urgent to maintain or improve performance of a system. Accordingly, available computing resources may be utilized to perform backfill operations regardless of a time of day.

To perform backfill operations, the backfill system 170 may generate events 109 executing in the computing environment 112a, where each of the events 109 causes at least one backfill operation to be performed in the computing environment 112b. The backfill system 170 may store the events 109 in the event processing queue 137. In some embodiments, the event processing queue 137 may comprise or be implemented as a first-in-first-out (FIFO) queue.

However, to prevent overloading of the computing environment 112b, the backfill system 170 may selectively control a rate at which events 109 are processed by the event processor 172. Accordingly, the resource monitor 180 may determine the availability, or lack thereof, of computing resources of the backfill system 170 or other application, system, or service in the networked environment 100 that affects the ability to process events 109 or perform backfill operations.

The event processor 172 may query the backfill system 170 or, more specifically, the distributed rate limiter system 175, to determine whether the event processing system 139 is permitted to perform backfill operations. For instance, the distributed rate limiter system 175 may determine whether to permit events 109 to be processed by the event processor 172 based at least in part on the availability of the computing resources identified. If no computing resources are available in the backfill system 170 or a new system 190, indicating that the backfill system 170 or the new system 190 is under a heavy workload, the distributed rate limiter system 175 may deny events 109 to be processed by the event processing system 139. Alternatively, if computing resources are available in the event processing system 139, the distributed rate limiter system 175 may permit events 109 to be processed by the backfill system 170.

Thus, the backfill system 170 may selectively control a rate at which events 109 are accessed such that the events 109 are processed and the backfill operations are performed when available computing resources of the computing environment 112a ... 112b permits. When permission has been obtained, the event processor 172 may access an event 109 from the event processing queue 137 and spawn a virtual process, such as a compute engine 183, configured to transform the legacy data 136 to new system data capable of interpretation by the second system. In some embodiments, the event 109 may be obtained from the event processing queue 137 in a FIFO manner. Accordingly, an event 109 having an oldest timestamp may be identified and removed from the event processing queue 137.

The compute engine 183 or other virtual process may be spawned in such a way that a predefined series of backfill operations, specified in the workflow metadata store 135, are performed. For instance, workflow metadata stored in the workflow metadata store 135 may include data specified by an administrator pertaining to the operations to be performed by the virtual process. For example, the workflow metadata store 135 may include operations required to translate the legacy data 136 to new system data for storage in the new system data store 134.

In various embodiments, a data migration may be performed on a per user account basis (e.g., per customer, patient, or other user). The backfill operations required to perform the migration of user account data may include aggregating data for a particular user account from a multitude of services or databases, supplementing the data with other data, modifying the format of the data, as well as other operations as may be appreciated.

The compute engine 183 may use the unique identifier for the user account to query data stores, services, or other data sources to obtain user account data for a user account corresponding to the unique identifier. The compute engine 183 may aggregate the user account data obtained from the various sources and, in some embodiments, any user account data not required by a new system may be discarded. Ultimately, the compute engine 183 may transform the user account data obtained from the various sources to new system data for storage in the new system data store 134. In some embodiments, the user account data may be transformed into a single row of a database, a single data structure, or other appropriate format of data as required by the new system. The backfill operations may be modeled as an automaton that uniquely identifies a single atomic unit, or a backfill operation, to be performed. By implementing automatons to perform backfill operations, an arbitrary number of backfill operations are able to be handled. Additionally, the backfill system 170 will cause no impact on which the new system 190 or other system the backfill system 170 is backfilling.

When a compute engine 183 is spawned in the event processing system 139, the compute engine 183 may be registered with the compute engine index 133. Additionally, the compute engine index 133 may retain types of events 109 for which a compute engine 183 has interest. For example, a compute engine 183 may be dedicated to performing backfill operations for events 109 received from the event processing queue 137.

In additional embodiments, the rate that events 109 are processed by the backfill system 170 may be controlled by a feedback loop 199. For instance, the backfill system 170 may receive events 109 from the event processing queue 137 as a stream of events 109. The stream of events 109 may be controlled, where a conservative rate of event processing is started initially and slowly increased or decreased based on available computing resources, as detected by the resource monitor 180.

Figure 2A:
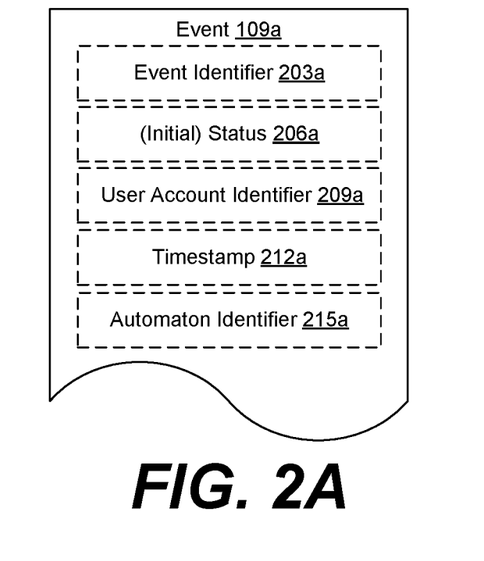
FIGS. 2A-2B are drawings showing embodiments of an event communicated in the event handling system of FIG. 1 according to various embodiments of the present disclosure.
Figure 2B:
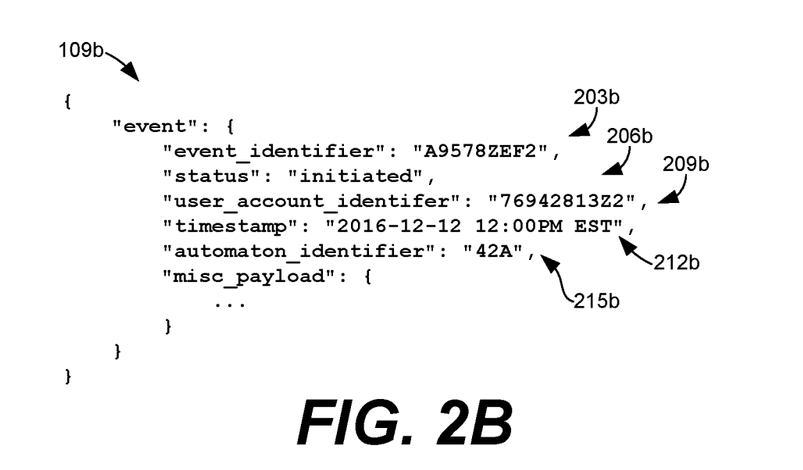

Referring next to FIGS. 2A-2B, the structure of an event 109a ... 109b communicated in the networked environment 100 is shown according to various embodiments. Specifically, FIG. 2A shows a schematic diagram for an event 109 while FIG. 2B shows an example JavaScript object notation (JSON) data structure that may be communicated over a network using hypertext transfer protocol (HTTP), hypertext transfer protocol secure (HTTPS), or other like protocol. While FIG. 2B shows a JSON data structure, other embodiments may include an extensible markup language (XML) data structure, a "YAML ain't markup language" (YAML) data structure, or similar data structures.

In various embodiments, an event 109 may generated by a service 106 or the backfill system 170 to include an event identifier 203a ... 203b, an initial status 206a ... 206b, an account identifier 209a ... 209b, a timestamp 212a ... 212b, an automaton identifier 215a ... 215b (also referred to as an operation(s) identifier), as well as additional information pertaining to a backfill operation to be performed by a compute engine 183 using a particular automaton or, in other words, a predefined series of operations to be performed by the compute engine 183 to transform legacy data to data for a new system 190. The event identifier 203 may include, for example, a unique identifier that may be used to query an event 109 from the event data store 130 or the event processing queue 137. The initial status 206 may include an identifier, label, or other description capable of identifying an initial status 206 of the backfill operation. As noted above, the computing environment 103 may maintain a status of a migration of the user account data for the single user account in a data store 129.

In some embodiments, the event 109 may include an event type that specifies that the event 109 is a backfill operation. In further embodiments, the event type may not be included in a transmission of an event 109. The account identifier 209 may include an identifier that uniquely identifies a user account associated with a client device 121. The user account may include an account logged into the client device 121 through one or more client applications 118. In embodiments in which compute engines 183 are generated for each user account, the account identifier 209 may be used by the event listener 140 to route the event 109 to appropriate compute engines 183 to translate user account data for interpretation by a new system 190.

The timestamp 212 may include a time at which the event 109 was generated or transmitted. As may be appreciated, the event 109 may also include information pertaining to a type of backfill operation to perform. For example, a particular set of operations may be performed for a first type of backfill operation while a different set of operations may be performed for a second, different type of backfill operation. Thus, the automaton identifier 215 may include an identifier, label, or other description capable of identifying a type of automaton, or series of operations to be performed by a virtual process. In some embodiments, the different types of automatons are stored in the workflow metadata store 135. Accordingly, when an event 109 is processed by the backfill system 170, the event processor 172 may read the automaton identifier 215 and spawn a virtual process that performs a series of operations according to the automaton identifier 215.

Figure 3:
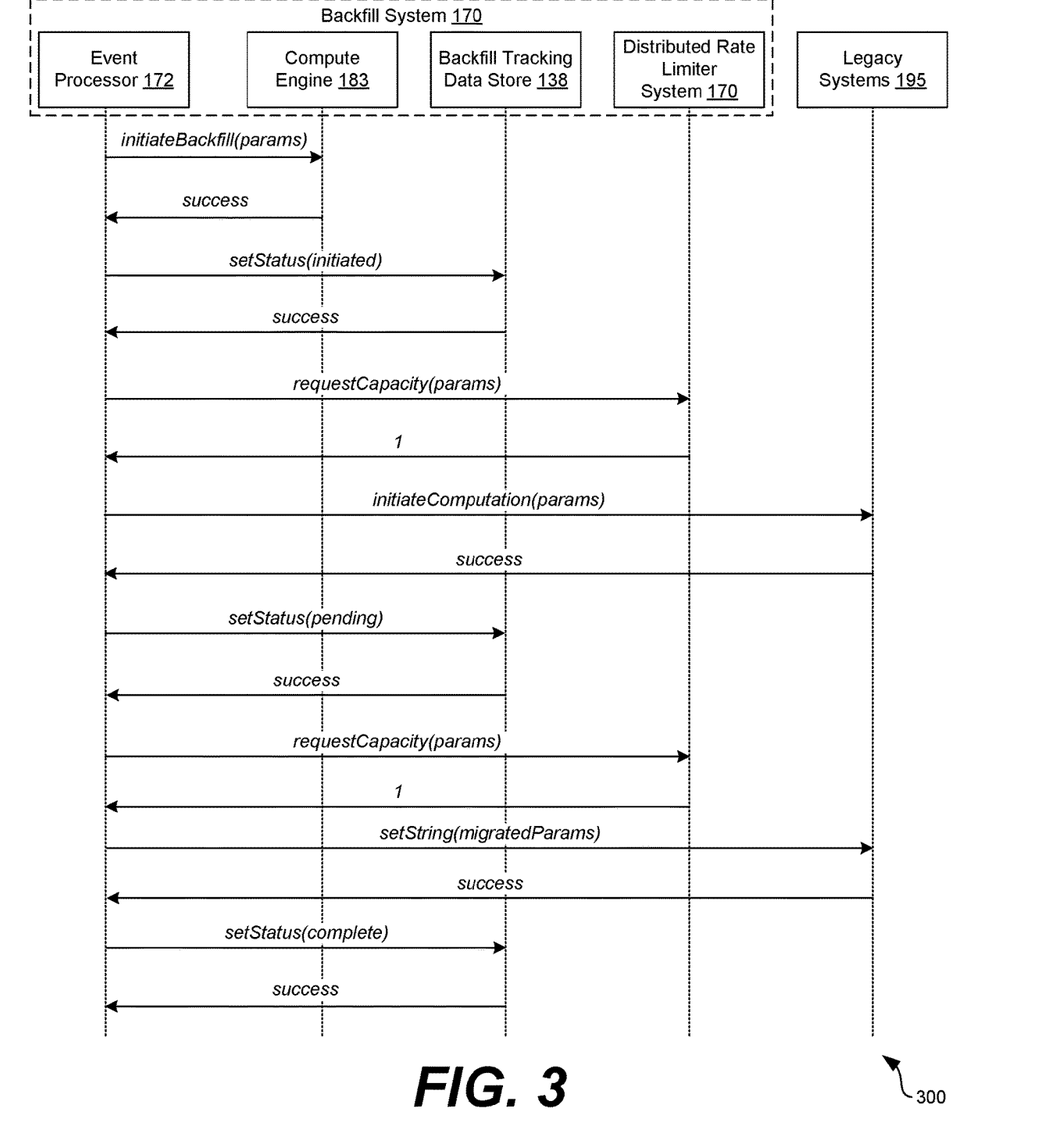
FIG. 3 is a sequence diagram illustrating functionality implemented by a backfill system executed in the event handling system of FIG. 1 according to various embodiments of the present disclosure.

Turning now to FIG. 3, a non-limiting example of a sequence diagram 300 is shown to describe various functions performed by the backfill system 170 according to various embodiments. The backfill system 170 may invoke service calls to perform a backfill operation, which may include service calls to downstream data sources or to legacy systems 195. Additionally, the backfill system 170 may be executed to determine an overall completion rate of a series of backfill operations, provide a detailed view of a backfill operation within a workflow, search for an individual backfill operation, allow for an adjustment of a transaction per second rate (TPS) for dependent services (e.g., the event processor 172), audit and reattempt failed backfill operations, obtain permission from the distributed rate limiter system 175 to perform a backfill operation, and stop one or more backfill operations.

The distribute rate limiter system 175 may limit a rate at which events 109 are processed by the event processing system 139. In some embodiments, the rate at which events 109 are processed by the event processing system 139 may be reflected as a TPS rate. Since backfill operations may cause high TPS spikes, a TPS limit may be imposed to protect the backfill system 170 from becoming overburdened. In additional embodiments, a backfill tracking data store 138 may be employed to include data pertaining to all user accounts for a given backfill operation. For example, user accounts may be selected at random for a backfill operation and data for the user accounts may be coalesced and stored in the backfill tracking data store 138 prior to starting the backfill operation. By doing so, a finite set of user account migrations is created, enabling a progress of a given backfill to be provided for a given user account. The backfill system 170 may include its own application programming interface (API) that may be invoked by other services to perform a backfill operation.

Initially, a service call, initiateBackfill( ), may be invoked to start a backfill operation. Thereafter, the backfill system 170 may invoke a service call, setStatus( ), to set an initial status 206 of the backfill system 170 as "initiated" or other appropriate status. Thereafter, a service call, requestCapacity( ), may be invoked to determine an availability of computing resources to perform the backfill operation. A service call, initiateComputation( ), may be invoked to obtain data to be migrated from legacy system 195. Next, the backfill system 170 may again invoke the setStatus( ) service call to update the status of the backfill operation as "pending" or other appropriate value. Again, the request Capacity( ) service call may be invoked to update the availability, or lack thereof, of computing resources to perform the backfill operation. The backfill system 170 may invoke the setString( ) service call to update data in the legacy systems 195 to reflect that the data has been migrated such that the data is not used in another backfill operation. Finally, the backfill system 170 may invoke the setStatus( ) service call to indicate that the backfill operation has been successfully completed.

Figure 4:
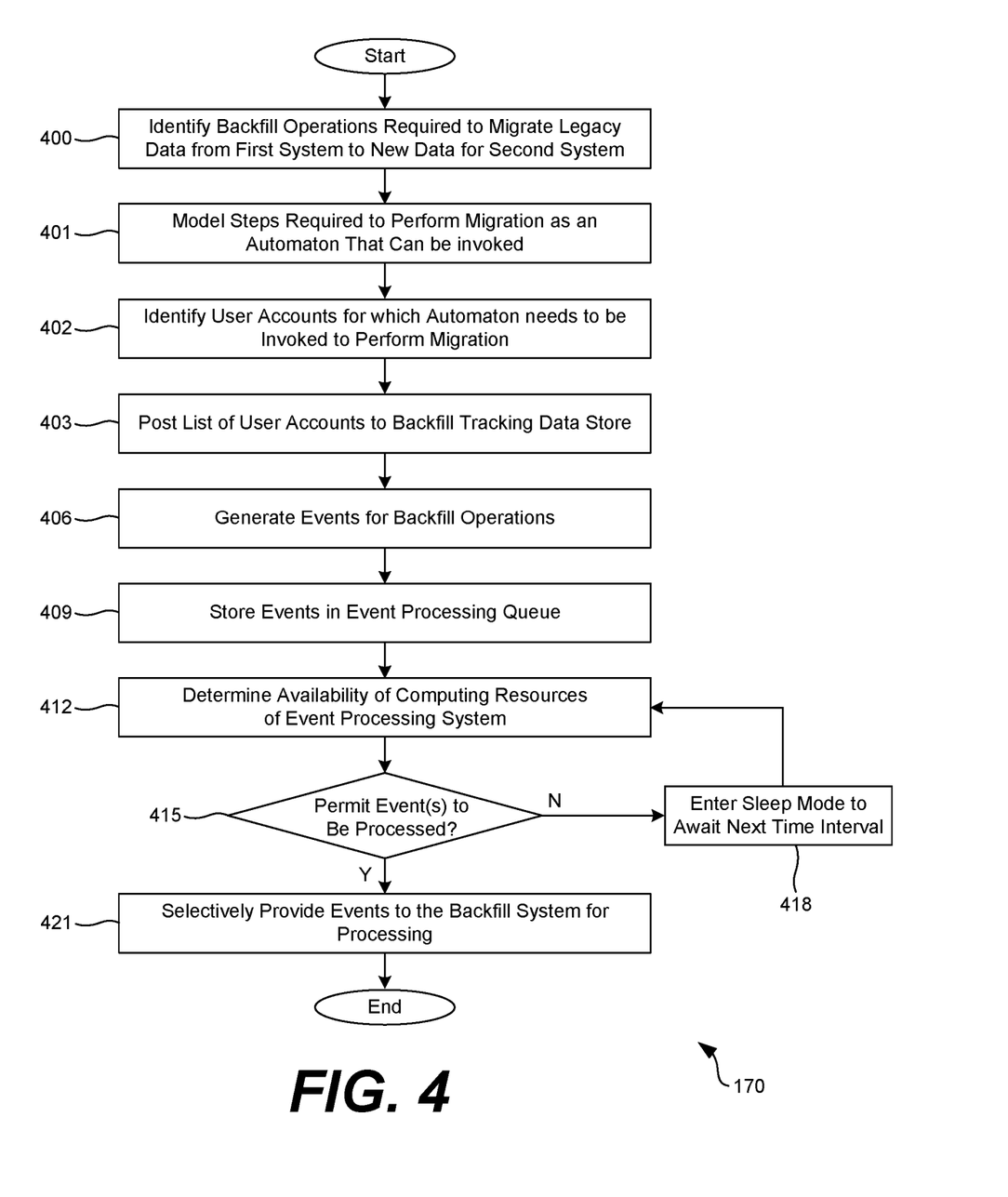
FIG. 4 is a flowchart illustrating functionality implemented by a backfill system executed in the event handling system of FIG. 1 according to various embodiments of the present disclosure.

Referring next to FIG. 4, shown is a flowchart that provides one example of the operation of the backfill system 170 according to various embodiments. It is understood that the flowchart of FIG. 4 provides merely an example of the many different types of functional arrangements that may be employed to implement the operation of the backfill system 170 as described herein. As an alternative, the flowchart of FIG. 4 may be viewed as depicting an example of elements of a method implemented in the computing environment 112b according to one or more embodiments.

Instead of processing an event 109 describing an interaction with a client application 118 or a service 106, the event processing system 139 may be used for backfill and migration operations. For examples, backfill operations may be performed to migrate data in a format for interpretation by a first system to a format for interpretation by a second system.

Beginning with 400, the backfill system 170 may identify that backfill operations are required, for example, to migrate legacy data 136 utilized by a first system (e.g., a legacy system 195) to new system data utilized by a second system (e.g., a new system 190). As an example, before a new shopping platform becomes live and starts accepting transactions from new customers, backfill operations may be performed to migrate data from a legacy shopping platform to the new shopping platform so that existing customers can also take advantage of new features and benefits of the new shopping platform.

In 401, the backfill system 170 may model the steps or backfill operations required to perform a migration as an automaton that may be invoked in the future to perform a migration of data. For instance, a series of operations to transform data from a legacy system 195 to data for use by a new system 190 may be determined. The series of operations, or backfill operations, may be stored as workflow metadata in the workflow metadata store 135 in association with an automaton identifier. When an event 109 is received that has a matching automaton identifier, a virtual process will be created to perform those series of operations, as stored in the workflow metadata store 135. The series of operations may include, for example, aggregating user account data, changing variable names, or otherwise formatting and restructuring data such that it can be used by the new system 190.

In 402, the backfill system 170 may identify the user accounts for which the automaton needs to be invoked to perform a successful migration of data. For instance, given an automaton or series of operations to be performed to migrate data, user accounts that require migration using the automaton may be identified.

In 403, the backfill system 170 may post a list of the user accounts identified in 402 to a backfill tracking data store 138. To this end, the backfill tracking data store 138 may include a list of user accounts that require migration, as well as an automaton required to be invoked to perform the migration. As user accounts are migrated from the legacy system 195 to a new system 190, the list of user accounts in the backfill tracking data store 138 may be updated, as can be appreciated.

In 406, the backfill system 170 may generate events 109 that, when processed, causes at least one backfill operation to be performed in the computing environment 112a. For example, the events 109 may be generated by the backfill system 170 using a particular automaton identifier 215 that directs the event processor 172 to spawn a virtual process to perform a backfill operation for a user account.

In 409, the backfill system 170 may store the events 109 in the event processing queue 137. In some embodiments, the event processing queue 137 may comprise or be implemented as a FIFO queue. A FIFO queue provides a greater degree of tolerance and scalability because a number of events 109 may be stored twice in the event processing queue 137 as a result of errors in the backfill system 170. A FIFO queue may be configured to account for duplicate events 109 having, for example, a same event identifier 203 such that multiple virtual processes aren't spawned to process the same event 109. In other embodiments, a different priority of retrieval of events 109 from the event processing queue 137 may be employed.

In 412, the resource monitor 180 may determine the availability, or lack thereof, of computing resources of the event processing system 139 or other applications, system, or service in the networked environment 100 that affects the ability to process events 109 or perform backfill operations. The availability of computing resources may affect the rate at which events 109 are consumed by the backfill system 170. The computing resources may include those of the backfill system 170, the computing environments 112a . . . 112b, the event processing queue 137, the new system 190, the legacy system 195, or other system or service described herein. In various embodiments, the resource monitor 180 may generate one or more metrics that are representative of a load on available computing resources. The metrics may include, for example, CPU utilization, GPU utilization, available storage space, available memory, network bandwidth, and similar resources.

Thereafter, the distributed rate limiter system 175 may determine whether to permit events 109 to be processed by the backfill system 170 or the event processor 172 based at least in part on the availability of the computing resources identified in 412. For example, if no computing resources are available in the backfill system 170, indicative of the computing environment 112b being under a heavy workload, the distributed rate limiter system 175 may deny events 109 to be processed by the backfill system 170 and the process may proceed to 418. In 418, the backfill system 170 may enter into a sleep mode or other period of inactivity to await a next time interval at which the availability of the computing resources is analyzed again in 412.

Referring back to 415, if computing resources are available in the event processing system 139, the distributed rate limiter system 175 may permit events 109 to be processed by the event processor 172 regardless of a time of day and the process may proceed to 421. In 421, events 109 may be selectively provided to the backfill system 170 such that the events 109 are processed and the backfill operations are performed when available computing resources of the computing environments 112a . . . 112b permit. A receipt of one of the events 109 may cause the event processor 172 to spawn a virtual process, such as a compute engine 183, configured to transform the legacy data 136 to new system data capable of interpretation by the second system, as will be discussed. Thereafter, the process may proceed to completion.

Figure 5:
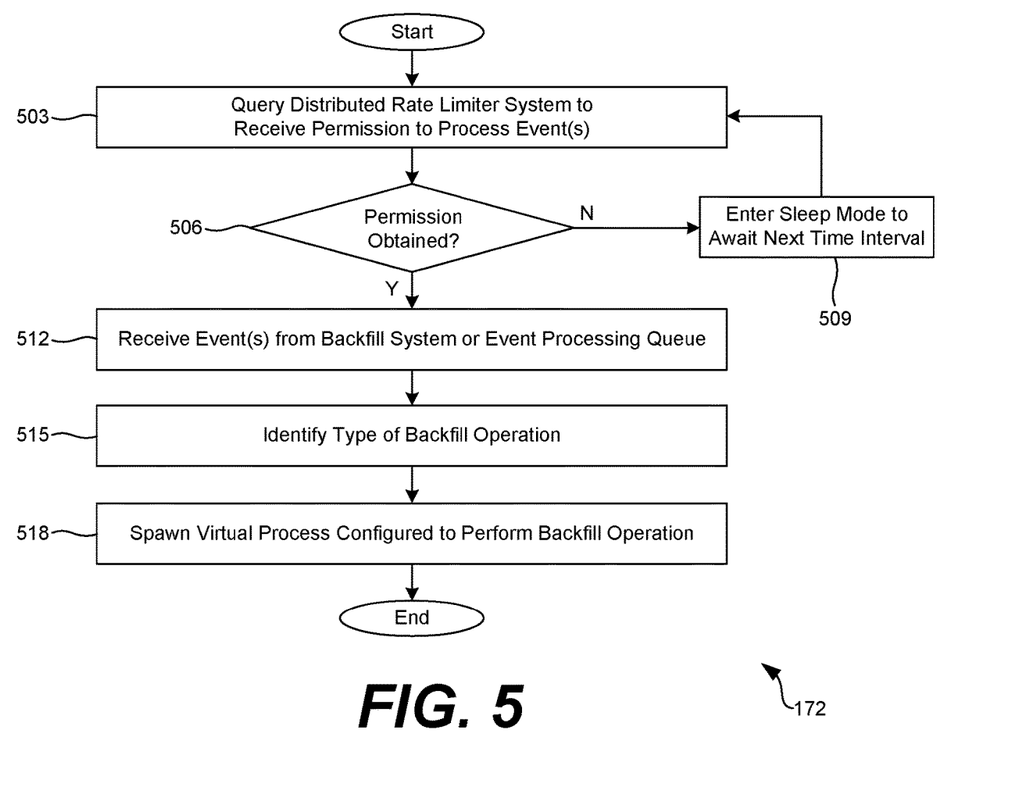
FIG. 5 is a flowchart illustrating functionality implemented by an event processing system executed in the event handling system of FIG. 1 according to various embodiments of the present disclosure.

Referring next to FIG. 5, shown is a flowchart that provides one example of the operation of the event processor 172 according to various embodiments. It is understood that the flowchart of FIG. 5 provides merely an example of the many different types of functional arrangements that may be employed to implement the operation of the event processor 172 as described herein. As an alternative, the flowchart of FIG. 5 may be viewed as depicting an example of elements of a method implemented in the computing environment 112b according to one or more embodiments.

Beginning with 503, the event processor 172 may query the distributed rate limiter system 175 to receive permission to process one or more events 109 in the event processing queue 137. The distributed rate limiter system 175 may determine whether to permit events 109 to be processed by the event processing system 139 based at least in part on the availability of the computing resources, as described above.

In 506, the event processor 172 may determine whether permission has been obtained from the distributed rate limiter system 175. For example, if insufficient computing resources are available in the backfill system 170, the distributed rate limiter system 175 may deny events 109 to be processed by the backfill system 170. In this case, the process may proceed to 509 where the backfill system 170 (or a subcomponent thereof) may enter a sleep mode to await the next time interval to query the distributed rate limiter system 175.

Referring again to 506, if computing resources are available in the backfill system 170, the new system 190, or the computing environment 112b, for example, to process one or more events 109, the event processor 172 may receive permission from the distributed rate limiter system 175 to process one or more events 109. Thereafter, the process may proceed to 512.

In 512, the event processor 172 may receive an event 109 from, for example, the event processing queue 137. For instance, in some embodiments, the backfill system 170 may pop an event 109 from the event processing queue 137 and provide the event 109 to the event processor 172. Alternatively, the event processor 172 may query the event processing queue 137 directly to obtain an event 109. In some embodiments, the event 109 can be obtained from the event processing queue 137 in a FIFO manner. Accordingly, an event 109 having an oldest timestamp may be identified and removed from the event processing queue 137.

Next, in 515, the event processor 172 may identify a type of backfill operation to perform. By identifying the event 109 as a backfill operation, a type of backfill operation may be identified based at least in part on the automaton identifier 215 field or the event identifier 203 field in the event 109.

In 518, the event processing system 139 may spawn a virtual process that is configured to perform a backfill operation, for example, based on a type of the backfill operation identified in 515. The virtual process may include a compute engine 183, which may further include a thread, a virtual machine, or other virtual process. The virtual process may be spawned in such a way that it invokes an automaton or, in other words, performs a workflow, or a series of operations, defined by workflow metadata accessed from the workflow metadata store 135. The workflow metadata store 135 may include data pertaining to the operations to be performed by the virtual process. For example, the workflow metadata store 135 may include the operations to perform to translate the legacy data 136 to new system data for storage in the new system data store 134. In some embodiments, the process may revert back to 503 to receive permission from the distributed rate limiter system 175 before each operation in a series of operations is performed. Alternatively, the process may proceed to completion.

Figure 6:
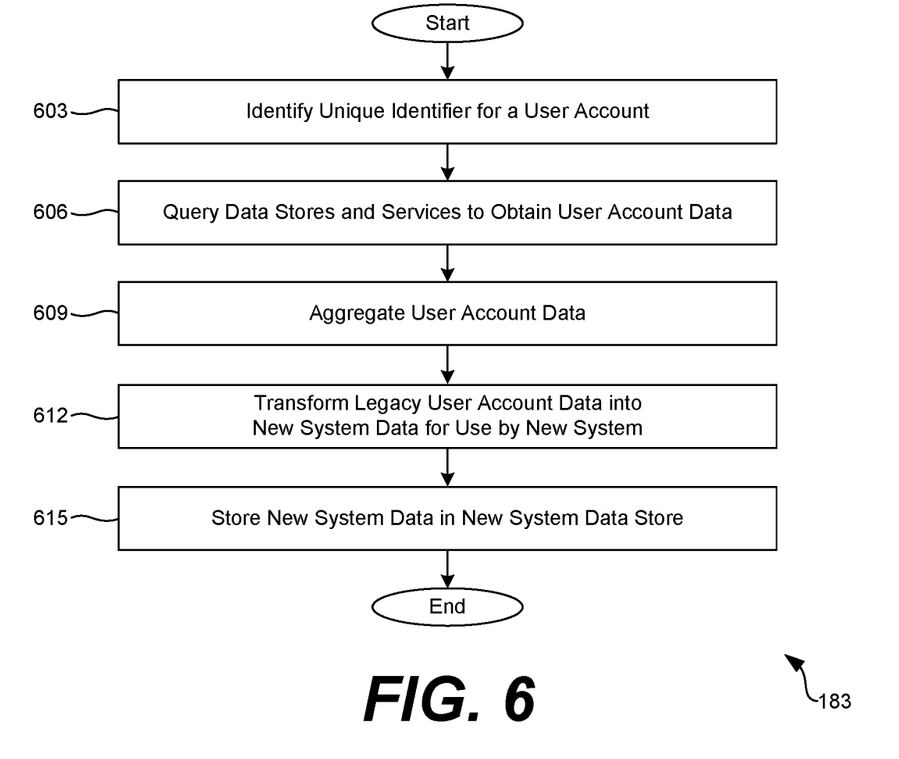
FIG. 6 is a flowchart illustrating functionality implemented by a compute engine or other virtual process spawned to perform a backfill operation in the event handling system of FIG. 1 according to various embodiments of the present disclosure.

Referring next to FIG. 6, shown is a flowchart that provides one example of the operation of the compute engine 183 or other virtual process according to various embodiments. It is understood that the flowchart of FIG. 6 provides merely an example of the many different types of functional arrangements that may be employed to implement the operation of the compute engine 183 as described herein. As an alternative, the flowchart of FIG. 6 may be viewed as depicting an example of elements of a method implemented in the computing environment 112b according to one or more embodiments.

As noted above, the event processing system 139 may spawn a virtual process that is configured to perform a backfill operation as specified by workflow metadata accessed from the workflow metadata store 135. For instance, the workflow metadata store 135 may include data pertaining to the operations to be performed by the virtual process. The workflow metadata store 135 may include the operations to perform to translate the legacy data 136 to new system data for storage in the new system data store 134. The non-limiting example of FIG. 6 depicts an example of operations that may be performed to transform user account data interpretable by a first system (e.g., a legacy system 195) to user account data interpretable by a second system (e.g., a new system 190).

In various embodiments, a data migration may be performed on a per user account basis (e.g., per customer, patient, or other user). The backfill operations required to perform the migration of user account data may include aggregating data for a particular user account from a multitude of services or databases, supplementing the data with other data, modifying the format of the data, as well as other operations as may be appreciated. Thus, in 603, the compute engine 183 may identify a unique identifier for a user account.

In 606, the compute engine 183 may use the unique identifier for the user account to query data stores, services, or other data sources to obtain user account data for a user account corresponding to the unique identifier. Thereafter, in 609, the compute engine 183 may aggregate the user account data obtained from the various sources in 606. In some embodiments, any user account data not required by a new system may be discarded.

In 612, the compute engine 183 may transform the user account data obtained from the various sources in 606. In some embodiments, the user account data may be transformed into a single row of a database, a single data structure, or other appropriate format of data as required by the new system. In 615, the compute engine 183 may store the data transformed for the new system as new system data in the new system data store 134 or in another appropriate data store. Thereafter, the process may proceed to completion.

Figure 7:
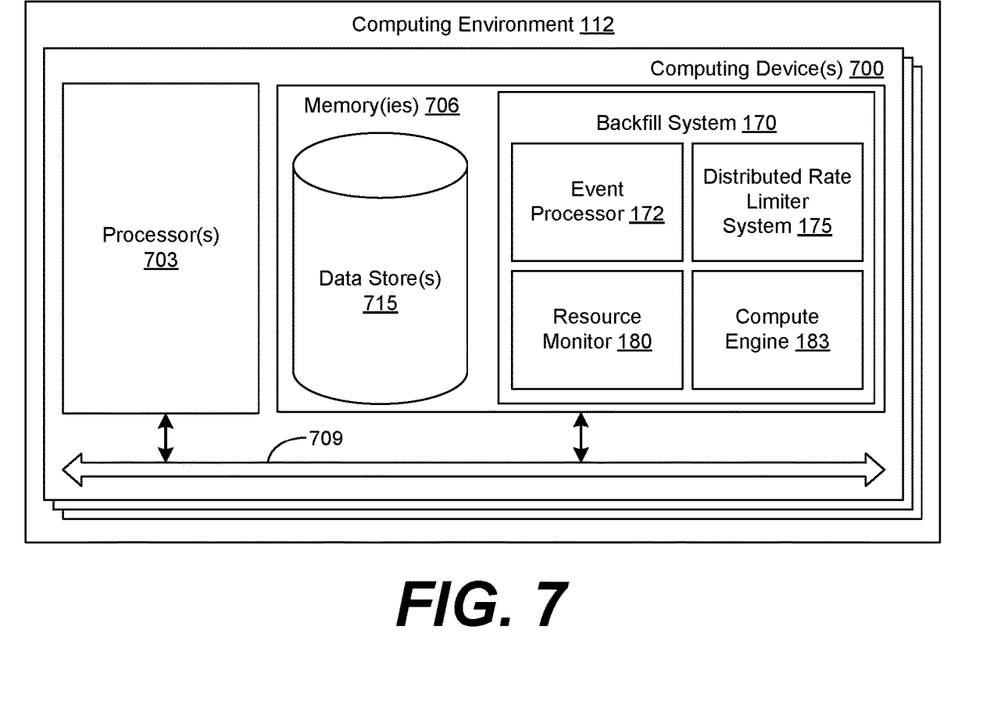
FIG. 7 is a schematic block diagram illustrating of a computing environment employed in the event processing system of FIG. 1 according to various embodiments of the present disclosure.

With reference to FIG. 7, shown is a schematic block diagram of the computing environment 112 according to an embodiment of the present disclosure. The computing environment 112 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as may be appreciated.

Stored in the memory 706 are both data and several components that are executable by the processor 703. In particular, stored in the memory 706 and executable by the processor 703 are the event processing system 139, the event listener 140, the event translator 143, the event processor 172, the compute engines 183, the backfill system 170, the distributed rate limiter system 175, the resource monitor 180, and potentially other applications. Also stored in the memory 706 may be a data store 715 and other data. The data store 715 may include, for example, the event data store 130, the pattern registry 131, the action registry 132, the compute engine index 133, the new system data store 134, the workflow metadata store 135, the legacy data 136, the event processing queue 137, as well as other data stores as may be appreciated. In addition, an operating system may be stored in the memory 706 and executable by the processor 703.

It is understood that there may be other applications that are stored in the memory 706 and are executable by the processor 703 as may be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that may ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 703 may represent multiple processors 703 and/or multiple processor cores and the memory 706 may represent multiple memories 706 that operate in parallel processing circuits, respectively. In such a case, the local interface 709 may be any appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the event processing system 139, the event listener 140, the event translator 143, the compute engine(s) 145, the backfill system 170, the distributed rate limiter system 175, the resource monitor 180, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4, 5, and 6 show the functionality and operation of an implementation of portions of the backfill system 170, the event processing system 139, and the compute engine(s) 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4, 5, and 6 show a specific order of execution, it is understood that the order of execution may differ from that which is depicted. For example, the order of execution of two or more blocks may be scrambled relative to the order shown. In addition, two or more blocks shown in succession in FIGS. 4, 5, and 6 may be executed concurrently or with partial concurrence. Further, in some embodiments, one or more of the blocks shown in FIGS. 4, 5, and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the event processing system 139, the event translator 143, the event processor 172, the compute engine(s) 145, the backfill system 170, the distributed rate limiter system 175, and the resource monitor 180 that comprises software or code can be embodied in any non-transitory computer-readable medium for use by or in connection with an instruction execution system such as, for example, a processor 703 in a computer system or other system. In this sense, the logic may comprise, for example, statements including program instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the event processing system 139, the event translator 143, the compute engines 183, the backfill system 170, the distributed rate limiter system 175, and the resource monitor 180, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 112.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device that, when executed, causes the at least one computing device to:
identify a plurality of backfill operations to migrate user account data from a first system to a second system;
generate a plurality of events for transmission over a network to an event processor executing in a computing environment, wherein each of the plurality of events comprises a data structure having an operation identifier that, when interpreted, causes at least one of the plurality of backfill operations to be performed in the computing environment;
store the plurality of events in a first-in-first-out event processing queue;
selectively control a rate at which the plurality of events are provided from the first-in-first-out event processing queue to the event processor such that the plurality of events are processed to perform the plurality of backfill operations when an availability of computing resources of the computing environment permits, wherein a receipt of one of the plurality of events spawns a virtual process configured to transform the user account data for a single user account to data capable of interpretation by the second system; and
increase or decrease the rate at which the plurality of events are provided to the event processor based on the availability of the computing resources.

2. The non-transitory computer-readable medium of claim 1, wherein the event processor is configured to, upon receipt of one of the plurality of events, query a distributed rate limiter system to receive permission to process event data from the first-in-first-out event processing queue.

3. The non-transitory computer-readable medium of claim 2, wherein the distributed rate limiter system is configured to provide permission to the event processor based at least in part on the availability of the computing resources.

4. A system, comprising:
at least one computing device; and
a memory device embodying program instructions executable in the at least one computing device that, when executed by the at least one computing device, cause the at least one computing device to:
identify a plurality of backfill operations to migrate legacy data from a first system to a second system;
generate a plurality of events to provide to an event processor executing in a computing environment, wherein each of the plurality of events causes at least one of the plurality of backfill operations to be performed; and
selectively provide the plurality of events to the event processor such that the plurality of backfill operations are performed when a computing resource of the computing environment permits, wherein a receipt of one of the plurality of events causes the event processor to spawn a virtual process configured to transform the data to a data format interpretable by the second system.

5. The system of claim 4, wherein each of the plurality of events comprises a unique identifier corresponding to a type of backfill operation to be performed using event data.

6. The system of claim 4, wherein the plurality of events are stored in an event processing queue, and the plurality of events are provided to the event processor through the event processing queue.

7. The system of claim 6, wherein:
the plurality of events are provided to the event processor through the event processing queue in a first-in-first-out (FIFO) manner; and
the event processing queue is configured to remove duplicates of the plurality of events using a unique identifier stored in association with the plurality of events.

8. The system of claim 7, wherein the event processor is configured to, upon receipt of one of the plurality of events, query a distributed rate limiter system to receive permission to process event data from the event processing queue based at least in part on an availability of computing resources.

9. The system of claim 8, wherein the distributed rate limiter system is configured to provide permission to the event processor based at least in part on the availability of the computing resources.

10. The system of claim 9, wherein the plurality of events are selectively provided to the event processor at a predetermined rate of event consumption.

11. The system of claim 10, wherein the predetermined rate of event consumption or a predetermined rate of generation of the plurality of events is determined based at least in part on an availability of the computing resources.

12. The system of claim 11, wherein the distributed rate limiter system is configured to:
initially set the predetermined rate of event consumption; and
increase or decrease the predetermined rate of event consumption based at least in part on the availability of the computing resources or the predetermined rate of generation of the plurality of events.

13. The system of claim 12, wherein the availability of the computing resources is determined by a resource monitor using at least one of: a central processing unit (CPU) utilization, a graphics processing unit (GPU) utilization, available storage space, available memory, and network bandwidth.

14. The system of claim 4, wherein the virtual process is configured to transform user account data for a single user account to data in the data format interpretable by the second system and maintain a status of a migration of the user account data for the single user account in a data store.

15. A method, comprising:
identifying, by at least one computing device, a plurality of backfill operations to migrate legacy data from a legacy system to a new system;
generating, by the at least one computing device, a plurality of events to provide to an event processor executing in a computing environment, wherein each of the plurality of events causes at least one of the plurality of backfill operations to be performed;
storing, by the at least one computing device, the plurality of events in an event processing queue; and
selectively controlling, by the at least one computing device, access to the plurality of events in the event processing queue for the event processor such that the plurality of events are processed to perform the plurality of backfill operations when a computing resource of the computing environment permits.

16. The method of claim 15, wherein a receipt of one of the plurality of events causes the event processor to spawn a virtual process configured to transform the data to a data format interpretable by the new system.

17. The method of claim 15, further comprising querying, by the at least one computing device, a distributed rate limiter system to receive permission to process event data from the event processing queue based at least in part on an availability of the computing resources.

18. The method of claim 15, wherein access to the plurality of events are selectively controlled based at least in part on a predetermined rate of event consumption determined based at least in part on an availability of the computing resources.

19. The method of claim 18, further comprising:
setting, by the at least one computing device, the rate of event consumption initially; and
increasing or decreasing, by the at least one computing device, the rate of event consumption based at least in part on the availability of the computing resources.

20. The method of claim 19, wherein the availability of the computing resources is determined by a resource monitor using at least one of: a central processing unit (CPU) utilization, a graphics processing unit (GPU) utilization, available storage space, available memory, and network bandwidth.

* * * * *